United States Patent
Rao et al.

(10) Patent No.: US 6,323,876 B1
(45) Date of Patent: Nov. 27, 2001

(54) IMAGE PROCESSING APPARATUS HAVING IMAGE REGION SPECIFYING FUNCTION

(75) Inventors: Gururaj Rao; Hiroki Kanno, both of Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/355,962

(22) PCT Filed: Dec. 4, 1998

(86) PCT No.: PCT/JP98/05497

§ 371 Date: Oct. 15, 1999

§ 102(e) Date: Oct. 15, 1999

(30) Foreign Application Priority Data

Dec. 4, 1998 (JP) .................................................. 9-349412

(51) Int. Cl.$^7$ ............................ G09G 5/00; H04N 1/387; G03G 15/36

(52) U.S. Cl. ............................ 345/634; 358/452; 399/183

(58) Field of Search ..................................... 345/113, 115, 345/634, 635; 399/81, 182, 183; 382/180; 358/452, 453, 537, 538

(56) References Cited

U.S. PATENT DOCUMENTS

| 4,896,208 | * | 1/1990 | Moriya et al. . |
| 5,406,389 | * | 4/1995 | Hasegawa et al. . |
| 5,831,590 | * | 11/1998 | Ikedo . |
| 5,937,232 | * | 8/1999 | Taguchi et al. . |

FOREIGN PATENT DOCUMENTS

| 1-212072 | 8/1989 | (JP) . |
| 2-59880 | 2/1990 | (JP) . |
| 3-172073 | 7/1991 | (JP) . |

* cited by examiner

Primary Examiner—Jeffery Brier
(74) Attorney, Agent, or Firm—Foley & Lardner

(57) ABSTRACT

A plurality of image regions in the image of the original document are determined on the basis of the image data of the original document. The positions of the plurality of image regions are then indicated as regions in the image of the original document by the display. With use of the display, the user specifies at least one point in the image of the original document in order to specify one region. On the basis of the coordinates of the position specified by the user and the relative positions of the image regions, the image region corresponding to the specified position is determined as the specified region. The image in the specified region is then subjected to the image process desired by the user.

10 Claims, 11 Drawing Sheets

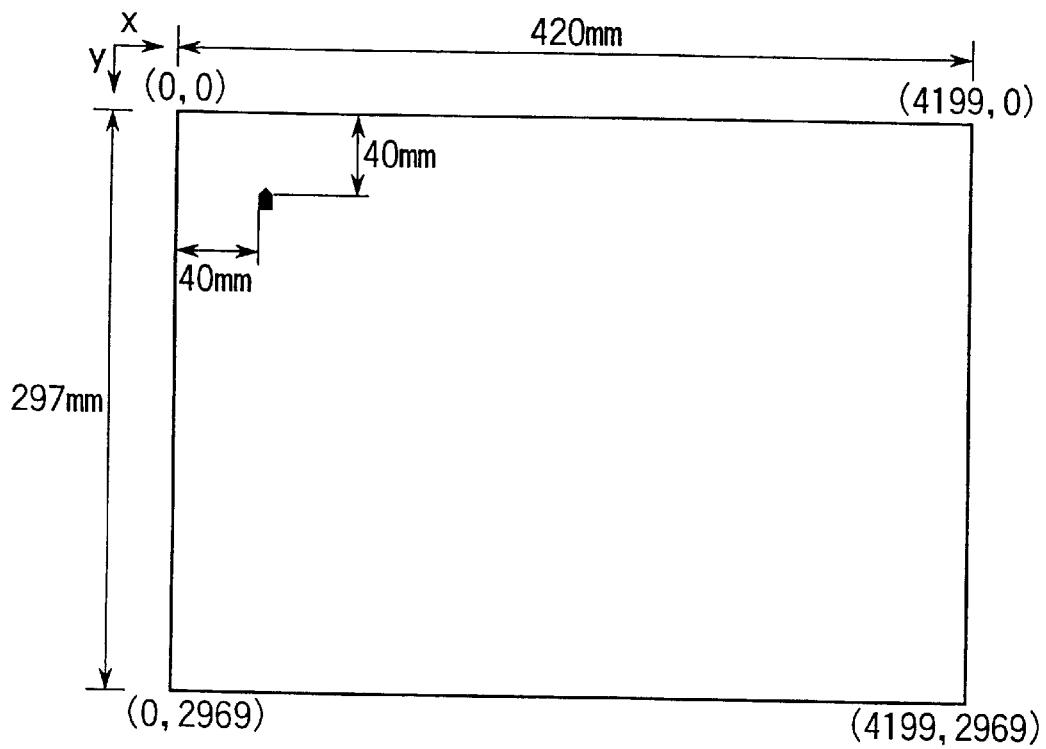
FIG. 2A
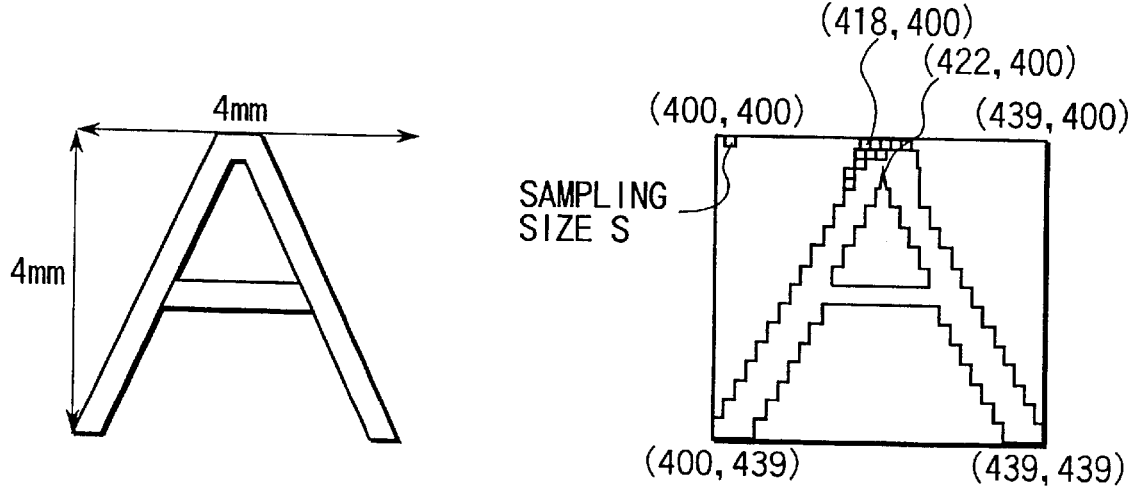
FIG. 2B
FIG. 2C

| y↓ \ x→ | 416 | 417 | 418 | 419 | 420 | 421 | 422 | 423 | 424 | 425 |
|---|---|---|---|---|---|---|---|---|---|---|
| 400 | 10 | 30 | 220 | 230 | 240 | 240 | 245 | 220 | 90 | 30 |
| 401 | 22 | 128 | 250 | 245 | 249 | 240 | 240 | 230 | 189 | 100 |
| 402 ⋮ | | | | | ⋮ | | | | | |

FIG. 7A
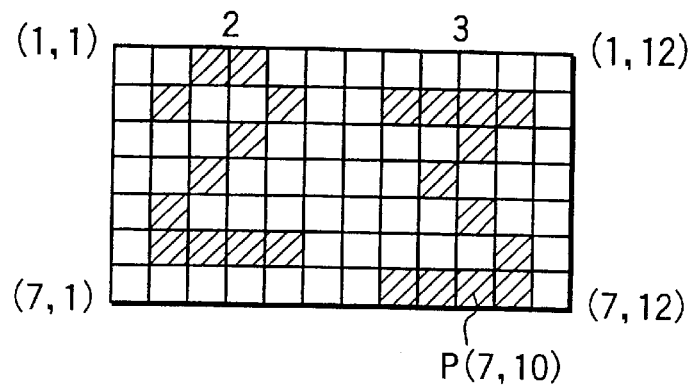
FIG. 7B
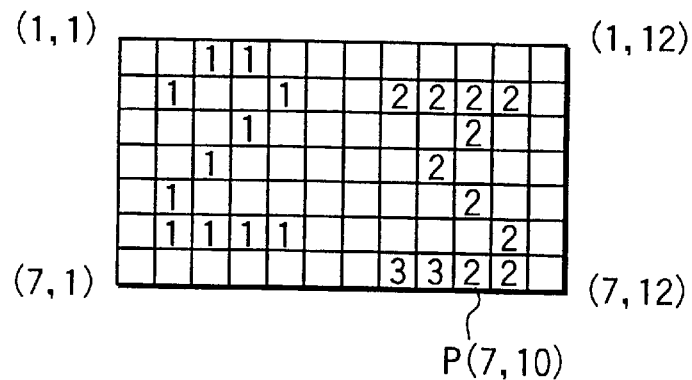
FIG. 7C
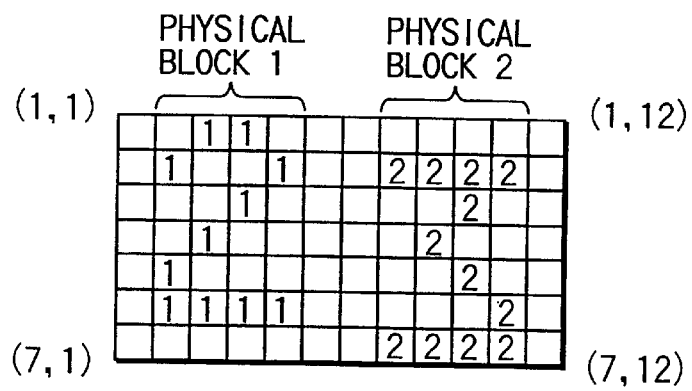
FIG. 7D
| PHYSICAL BLOCK | INITIAL COORDINATE | | END COORDINATE | |
|---|---|---|---|---|
| | XS | YS | XE | YE |
| 1 | 2 | 2 | 5 | 6 |
| 2 | 8 | 2 | 11 | 7 |

NUMBER REGIONS : Rn           3e

| | |
|---|---|
| (XS1, YS1) | → INITIAL COORDINATE OF REGION A |
| (ΔX1, ΔY1) | → SIZE OF REGION A |
| 0 | → PHOTOGRAPH (ATTRIBUTE) |
| 0 | → SPECIFIED/NON-SPECIFIED BY USER |
| (XS2, YS2) | → INITIAL COORDINATE OF REGION B |
| (ΔX2, ΔY2) | → SIZE OF REGION B |
| 0 | → CHARACTER (ATTRIBUTE) |
| 1 | SPECIFIED/NON-SPECIFIED BY USER |
| ⋮ | |
| (XSon, YSon) | → INITIAL COORDINATE OF REGION N |
| (ΔXon, ΔYon) | → SIZE OF REGION N |
| 0 | → CHARACTER (ATTRIBUTE) |
| 0 | → SPECIFIED/NON-SPECIFIED BY USER |

FIG. 11

NUMBER REGIONS : Rn           3e

| | |
|---|---|
| (XS1, YS1) | → INITIAL COORDINATE OF REGION A |
| (ΔX1, ΔY1) | → SIZE OF REGION A |
| 0 | → PHOTOGRAPH (ATTRIBUTE) |
| 0 | → SPECIFIED/NON-SPECIFIED BY USER |
| (XS2, YS2) | → INITIAL COORDINATE OF REGION B |
| (ΔX2, ΔY2) | → SIZE OF REGION B |
| 0 | → CHARACTER (ATTRIBUTE) |
| 1 | SPECIFIED/NON-SPECIFIED BY USER |
| ⋮ | |
| (XSon, YSon) | → INITIAL COORDINATE OF REGION N |
| (ΔXon, ΔYon) | → SIZE OF REGION N |
| 0 | → CHARACTER (ATTRIBUTE) |
| 0 | → SPECIFIED/NON-SPECIFIED BY USER |

FIG. 13

IMAGE PROCESSING APPARATUS HAVING IMAGE REGION SPECIFYING FUNCTION

TECHNICAL FIELD

This invention relates to an image forming apparatus such as a digital copying machine, in particular, a technique of specifying a region in an image and processing it.

BACKGROUND ART

In the conventional image processing, a scanner provided in a digital copying machine reads an image on an original document. A user designates a region of the image thus read, by specifying at least two coordinates. The image designated is subjected to processing such as edition or insertion.

To designate the region of the image, the coordinates must be specified very precisely, however. Hence, the user needs to spend much time and labor to specify the coordinates if the region has a complicated shape.

In stead of specifying the coordinates of the image region, there is provided another method by which a desired image region in an original document is specified with a marker or the like in advance, and then the original document is read by a scanner to recognize the specified image region. According to this method, however, it is very troublesome when a plurality of original documents are given for a user to manually specify each of image regions in each of the original documents.

DISCLOSURE OF INVENTION

The object of the present invention is to provide an image region specifying method by which a user can easily specify a desired image region on the basis of the image discrimination result of a read original document (by one action, for example), an image processing apparatus for processing the image of the specified image region, and an image forming apparatus.

In order to solve the aforementioned problem, according to one aspect of the present invention, there is provided image processing apparatus comprising: image region determination means for determining a plurality of image regions in input image of the original document on the basis of input image data of the original document; display means for displaying positions of the image regions determined by the image region determination means in the image of the original document; specifying means for specifying at least one position of a point on the basis of contents displayed by the display means; determination means for determining an image region corresponding to the specified position as a specified region on the basis of coordinates of the position specified by the specifying means and relative positions of the image regions; and image processing means for processing an image in the specified region determined by the determination means.

Image region determination means has means for determining more than one non-image region located between the determined plurality of image regions. The determination means determine the non-image region as the specified region when the specified position is located in the non-image region determined by the image region determination means. The display means has means for displaying the specified region determined by the determination means so as to be discriminated from the other image regions, for example, by changing the brightness therein.

The display means has means for displaying a contour of each of the image regions determined by the image region determination means at a corresponding position in a frame of the image of the original document.

The image region determination means comprises means for calculating a position and a size of each of objects constituting the image of the original document in order to supply them as a featuring amount; and means for determining a plurality of image regions by unifying each of collections of the objects having the same attribute on the basis of the featuring amount.

BRIEF DESCRIPTION OF DRAWINGS

FIGS. 2A to 2C show an image input operation by an image input section;

FIGS. 7A to 7D schematically show operations by an 8-adjacent linked components extraction section, a labeling/grouping section, and a coordinates calculation section shown in FIG. 5;

FIG. 11 shows the contents stored in a discrimination result storing section shown in FIG. 4;

FIG. 13 shows an example of image region information which is stored in the discrimination result storing section when the image region is specified;

BEST MODE OF CARRYING OUT THE INVENTION

An embodiment of the present invention will be described below with reference to the drawings.

Figure 1:
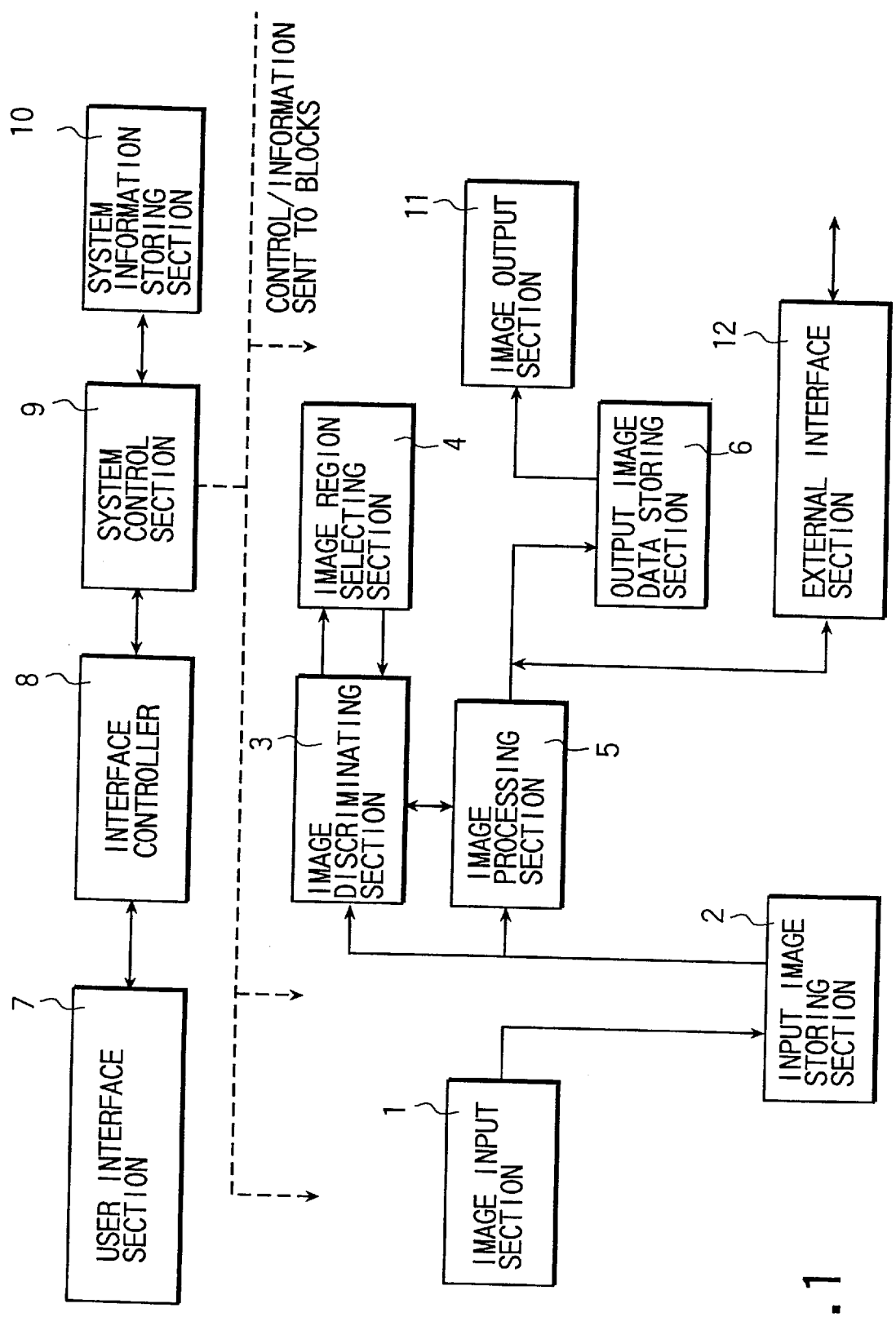
FIG. 1 is a block diagram showing the constitution of an image forming apparatus according to an embodiment of the present invention.

FIG. 1 shows the constitution of an image forming apparatus according to the present embodiment. The image forming apparatus comprises an image input section 1 constituted by such a device as a scanner to read an image on the original document and input into the apparatus; an input image storing section 2 for temporarily storing the image input by the image input section 1; an image discriminating section 3 for discriminating the attribute of the input image by calculating a featuring amount of the input image; an image region selecting section 4 for selecting an image region in accordance with the user's instruction; an image processing section 5 for reading the image corresponding to the selected image region from the input image storing section 2 and processing the read image in accordance with the user's instruction; an output image data storing section 6 for temporarily storing the processed image; a user interface section 7 for displaying the instruction of the user or the processing result to be informed to the user; a controller 8 for controlling the user interface section 7; a system control section 9 for integrally controlling the apparatus; a system information storing section 10 for storing input information, processed information, or output information; and an image output section 11 for outputting the processed image. The apparatus may further comprises an external interface section 12 for connecting the apparatus to an arbitrary network. Via an arbitrary network such as a public network or as a LAN connected by the external interface section 12, for example, the image processed by the image processing section 5 can be output to the external apparatus.

The above-mentioned section will be described below more specifically.

Image Input Section

The image input section 1 includes an input device such as a scanner, and is used to input image data into the image forming apparatus. With use of a scanner having resolution of 10 pixels/mm (8 bits/pixels) as the input device for example, the information on the original document, which is to be input, is sampled to obtain 10 pixels for each 1-mm range. (That is, the sampling is performed at the pitch of 0.1 mm.)

FIGS. 2A, 2B and 2C schematically show the information obtained by the sampling of the original document (e.g. the sampling of an original document having A3 size [420 mm×297 mm] at a 0.1 mm pitch).

FIG. 2A shows 4200×2970 pixels obtained by the sampling. These pixels are represented by about 12 megabytes of data if each pixel has 256 tones. Assume that a character having a size of 4 mm×4 mm as shown in FIG. 2B is located at a distance of 40 mm in the X (lateral) direction from an origin (i.e., the upper-left corner of the original document) and at a distance of 40 mm in the Y (longitudinal) direction from the origin. Then, as shown in FIG. 2C, the initial coordinates of the character will be (400, 400), and the end coordinates thereof will be (439, 439), after the sampling. The image is sampled in units of an area S as shown in FIG. 2C, and the resultant value is determined as the pixel value at the coordinates. For example, when the sampled value in an area located at a position 41.9 mm distant from the origin in the longitudinal direction and 40.1 mm in the lateral direction is 220, the sampled value is determined as the pixel value at coordinates of (418, 400).

Figures 3, 4:
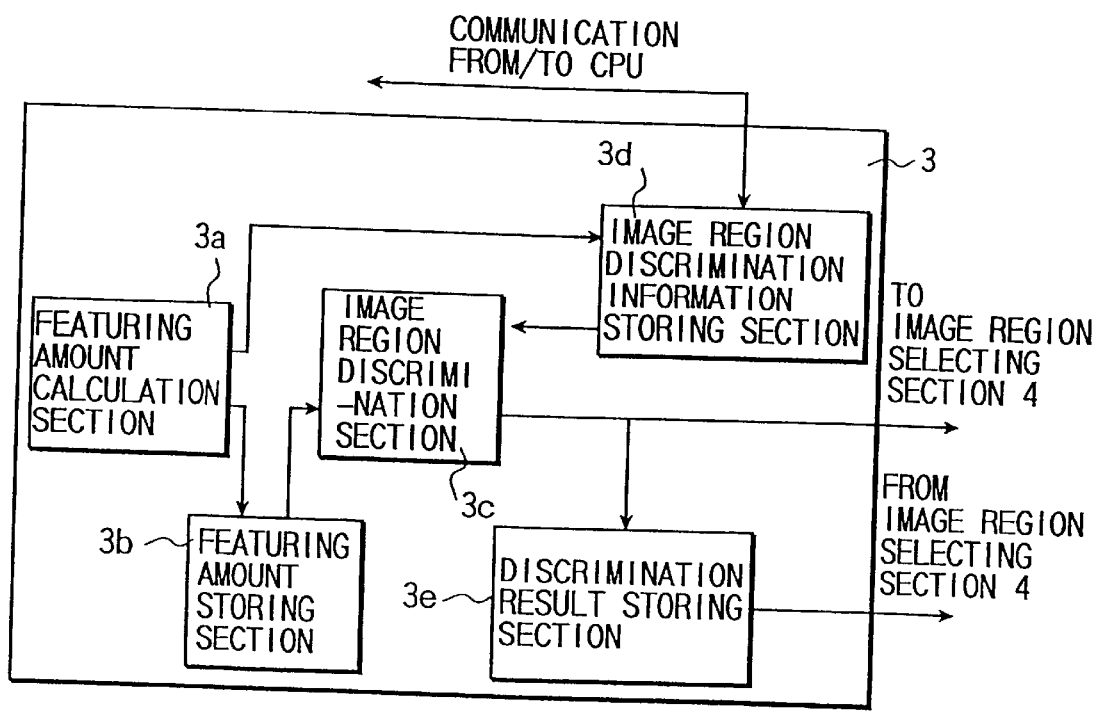
FIG. 3 shows an example of the contents stored in the input image storing section.
FIG. 4 is a block diagram showing the constitution of an image discriminating section.

FIG. 3 shows the relationship between the coordinates of the pixels and the pixel values obtained by the sampling process.

FIGS. 2A, 2B, 2C and 3 show an example of the sampling operation with the sampling frequency of 10 pixel/mm. The sampling with the other sampling frequency is performed also in accordance with the same principle.

Input Image Storing Section

The input image storing section 2 stores the pixel values of the sampled pixels at addresses corresponding to the coordinates obtained by the sampling process, as shown in FIG. 3, for example. The pixel values each represent the density of the pixel at the coordinates. In this example, the pixel value increases as the density of the pixel increases.

Image Discriminating Section

FIG. 4 shows an example of the constitution of the image discriminating section 3. The image discriminating section 3 comprises a featuring amount calculation section 3a; a featuring amount storing section 3b; an image region discrimination section 3c; an image region discrimination information storing section 3d; and a discrimination result storing section 3e.

Figure 5:
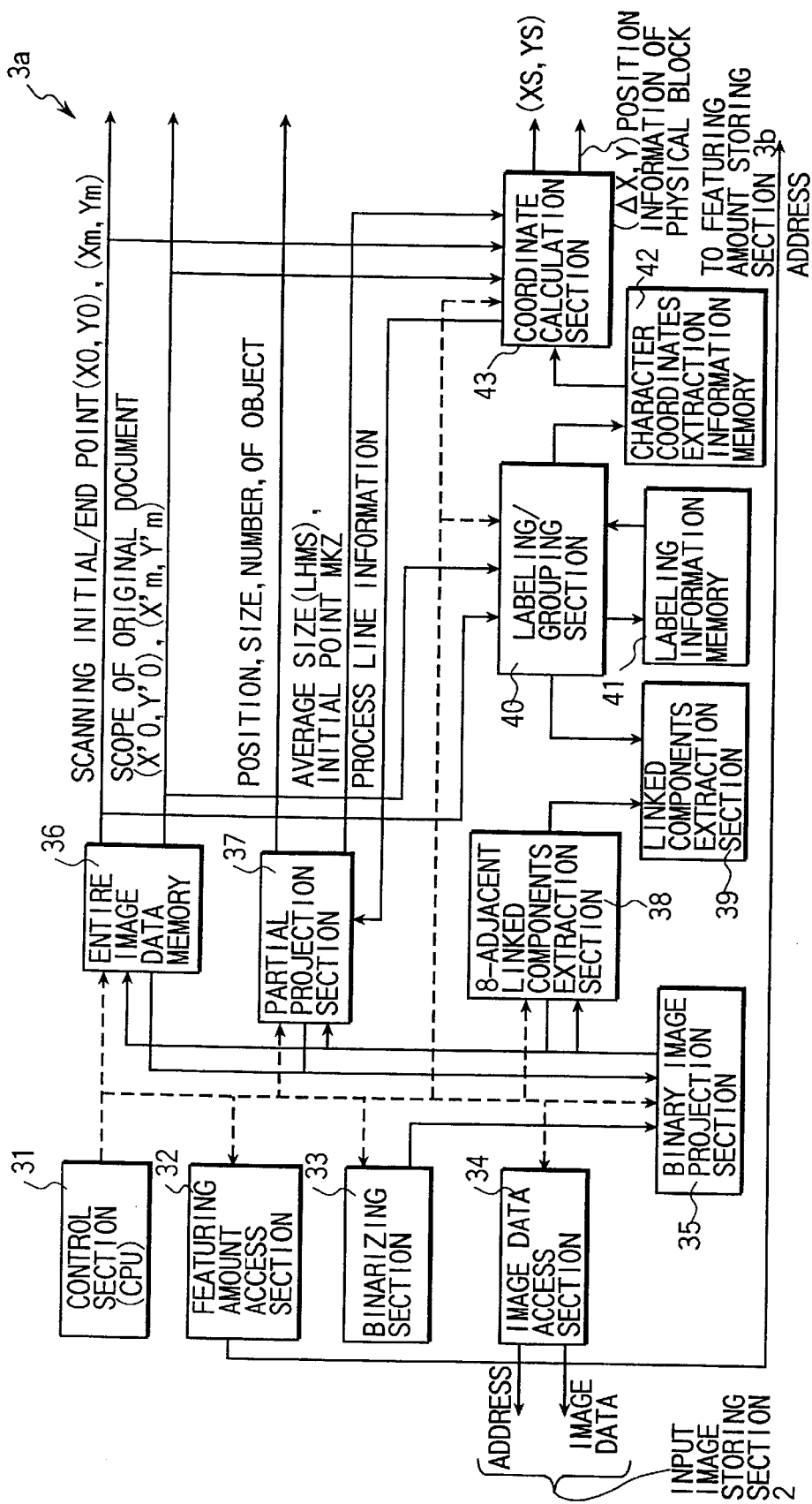
FIG. 5 is a block diagram showing the constitution of an featuring amount calculation section shown in FIG. 4.

FIG. 5 shows an example of the constitution of the featuring amount calculation section 3a. A control section 31 controls the featuring amount calculation section 3a during all the processing operation of the featuring amount calculation section 3a. A featuring amount access section 32 generates an address for storing the featuring amount calculated for the image of the original document in the featuring amount storing section 3b shown in FIG. 4, a control signal and the like. An image data access section 34 generates an address for reading the image of the original document from the input image storing section 2 shown in FIG. 1, a control signal, and the like.

A binarizing section 33 receives the image data read by the image data access section 34 from the input image storing section 2 and binarizes it. The read pixel value is compared with the threshold value set in advance. When the pixel value is larger than the threshold value, the pixel value is binarized as "1" (black point), otherwise, binarized as "0" (white point).

A binary image data memory 35 is a memory for storing the binarized image by the binarizing section 33.

An entire image projecting section 36 calculates longitudinal and lateral projections of an entire image on the basis of the binary image data stored in the binary image data memory 35. The projection value smaller than a predetermined threshold value is set as "0", and the other projection value remains unchanged. "Projection" means the process of accumulating the number of only black pixels in each of the pixel columns and rows as the projection value of the column or row.

Figure 6:
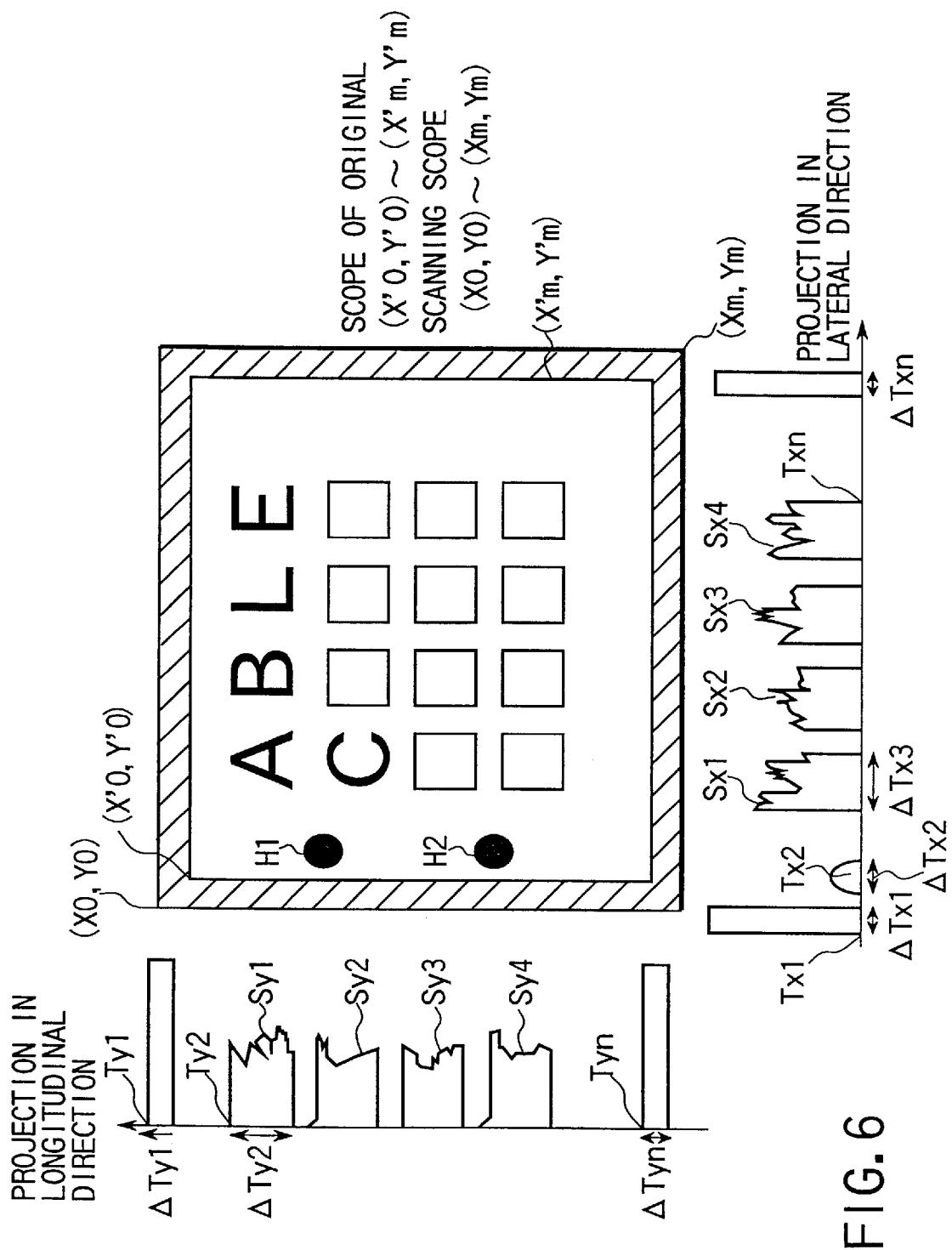
FIG. 6 schematically shows the projection by an entire image projecting section shown in FIG. 5.

FIG. 6 shows an example of the entire projection obtained by the entire image projecting section 36 on the basis of the binary image of the original document data. By arbitrarily setting the threshold value (for example, at 3% of the largest number of the pixels to be accumulated), various information in the binary image data of the original document can be obtained. FIG. 6 shows the case where the area to be read is larger than the original document area. By calculating the initial coordinates [Tyi (i=1, 2, . . . , Ny) in the longitudinal direction, Txj (j=1, 2, . . . , Nx) in the lateral direction] of the hills of the longitudinal/lateral projections and the widths [ΔTyi (i=1, 2, . . . , Ny) in the longitudinal direction ΔTxj (j=1, 2, . . . , Nx) in the lateral direction] of the hills of the projections, various data in the binary image data, such as the distances between the character columns, between the characters, and the margin surrounding the original document area can be obtained.

An example of the calculation method of calculating the original document area on the basis of the scanning area will be described below. When the initial value of the scanning is (X0, Y0, where X0=0, and Y0=0), and the end value is (Xm, Ym), the initial value (X'0, Y'0) and the end value (X'm, Y'm) of the original document area are calculated.

When the initial coordinates Ty1 of the first hill of the longitudinal direction projection is "0", the following relationship can be obtained:

$$Y'0 = Y + \Delta Ty1.$$

When Ty≠0, Y'0 can be represented as $$Y'0 = Y0.$$

When the addition of the initial coordinates Tyn and the width ΔTyn of the last hill of the longitudinal direction projection is Ym, in short, when the relationship (Tyn+ΔTyn=Ym) can be obtained, Y'm can be represented as shown below.

$$Y'm = Ym - \Delta Tyn.$$

In the case of (Tyn+ΔTyn≠Ym), Y'm is represented as Y'm=Ym.

X'0 and X'm of the lateral direction projection can be calculated in the similar manner. The scanning area extends from the coordinate (X0, Y0) to the coordinate (Xm, Ym). The area extending from the coordinate (X'0, Y'0) to the coordinate (X'm, Y'm) is the original document area. When the scanning area and the original document area are different in size, the region (shaded area shown in FIG. 6) as the difference of the areas is regarded as an unnecessary region. The information such as the area information of the unnecessary region, the information of the starting and the end points of the scanning, and the information of the original document area is stored in the image region discrimination information storing section 3d.

A partial projection section 37 receives from the entire image projecting section 36 information of the initial points of the hills of the longitudinal/lateral projection, the widths of the hills, the scanning area, the original document area, and the like. On the basis of the information of hills of the longitudinal direction projection and the widths thereof, the binary image data corresponding to each of the hills is read from the binary image data memory 35, and then the lateral direction projection of each of the read image data is obtained.

By performing such a partial projection process, the number of the hills (objects) of the lateral direction projection and the initial point and the size of each object are stored in the image region discrimination storing section 3d, so as to correspond the information of each of the hills of the longitudinal projection. The information of the lateral projection such as an initial point MKZ of each object and the average size LHMS (average value of the width of the hills of the lateral direction projection, which is generally regarded as the average value of the character sizes) is sent to a coordinates extraction section 43.

Similarly to the partial projection section 37, the 8-adjacent linked components extraction section 38, a labeling/grouping section 40, and the coordinates calculation section 43 calculate the coordinates of each character for specifying the position of the character for each character column. These sections execute a process basically similar to that performed by the partial projection section 3, i.e., the extraction of characters. The pixels forming each character are not always linked together. Thus, the characters are each extracted as a plurality of objects, merely by calculating the projection even if there is only one character. These sections thus extract one character region by calculating the linked pixel components on the basis of the positions of the pixels in more detail than by the process in the partial projection section 37.

The above-mentioned process by the 8-adjacent linked components extraction section 38, the labeling/grouping section 40, and the coordinates calculation section 43 will be schematically described below with reference to FIG. 7. As shown in FIG. 7A, the process described below is performed for binarized numerals "2" and "3" as binary image data to be processed. The binary image data as shown in FIG. 7A is firstly subjected to a linked components extraction process of the 8-adjacent linked components extraction section 38 in order to give a label to the main pixel of the linked components, as shown in FIG. 7B. The labeling/grouping section 40 executes grouping of equivalent groups on the basis of the labels given to the pixels as shown in FIG. 7C. On the basis of the result of the grouping, the initial coordinates and the end coordinates of the linked pixels (i.e., the physical block) are obtained, as shown in FIG. 7D.

Figure 8A:
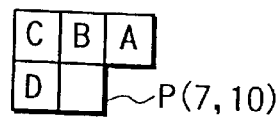
FIGS. 8A and 8B schematically show the operation by the 8-adjacent linked components extraction section shown in FIG. 5.

The 8-adjacent linked components extraction section 38 calculates the linked components of the interest pixel. FIG. 8A shows adjacent cells necessary for obtaining the linked components of an interest pixel P, as an example. The linked components of the pixel P are calculated in accordance with the following procedures:

When the pixel value of the pixel P is "0", the label of the pixel P is set as "0";

When the pixel value of the pixel P is "1" and all the labels of adjacent pixels A, B, C and D which have been already processed are "0", the pixel P is given a new label.

When the pixel value of the pixel P is "1" and at least one of adjacent pixels A, B, C and D has the label other than "0", one (the minimum label, for example) of the labels other than "0" is selected to be set as the label of the pixel P, and it is recorded that all the pixels having labels other than "0" are equivalent.

Figure 8B:
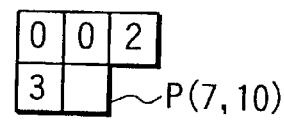

Assuming that the coordinates of the pixel P to be processed is (7, 10) as shown in FIG. 7B, for example, and the adjacent pixels A, B and C shown in FIG. 8A have been already processed and given label values as shown in FIG. 8B. The label value of the pixel to be processed is set at "1", and thus the minimum one (i.e., "2") of the label values other than "0" among the adjacent pixels is set as the label value of the pixel P. Further, there are pixels given the other label values than "0" (e.g. "2" or "3") among the adjacent pixels, and it is thus recorded that label value "2" is equivalent to label value "3".

The label value of each pixel and the equivalent label information are stored in the linked components information memory 39.

The labeling/grouping section 40 reads label value (label data of the linked component) of each pixel and equivalent label information (equivalent label data) from the linked components information memory 39, groups the equivalent labels, and replaces the labels of the grouped pixels with new labels, as shown in FIG. 7C. The information of the new label added to the grouped pixels is stored in a labeling information memory 41.

Subsequently, the labeling/grouping section 40 scans the labeling information memory 41 to read the minimum coordinates and the maximum coordinates which have the same label. The coordinates having the same label are contained in a physical block linked as one block, and thus the minimum coordinates is set as the initial coordinates of the physical block, and the maximum coordinates is set as the end coordinates of the physical block. The information of these coordinates is stored in a character coordinates extraction information memory 42.

The coordinates extraction section 43 executes unification of the physical blocks stored in the character coordinates extraction information memory 42 on the basis of LHMS as the average size of objects and MKZ as the initial points of the objects which are set from the partial projection section 37. By performing this process, coordinates of one character constituted of a plurality of linked components for example, is calculated. In this example, a physical block located in the area ranged from the initial point MKZ to the average size LHMS is regarded as one character. The coordinates of each of the unified physical blocks and the data thereof show that the minimum coordinates is the initial coordinates of the character to be processed, and the maximum coordinates is the end coordinates of the character.

For example, assuming that

Physical block 1 having initial coordinates (xs1, ys1), and end coordinates (xe1, ye1) and Physical block 2 having an initial coordinates (xs2, ys2), and an end coordinates (xe2, ye2) are unified, the initial coordinates (xs, ys) and the end coordinates (xe, ye), and the size ($\Delta x$, $\Delta y$) of the unified physical block are represented as follows:

xs=min (xs1, xs2)

ys=min (ys1, ys2)

xe=max (xe1, xe2)

ye=max (ye1, ye2)

$\Delta x$=xe−xs $\Delta y$=ye−ys

The above-mentioned process is executed for all the character columns to calculate the coordinates values or the sizes ($\Delta x$, $\Delta y$) of all the characters in the document. However, the physical block having the initial point the end point of the scanning area or the initial point the end point of the original document area as its own coordinates value is not unified with the other physical blocks.

Figure 9:
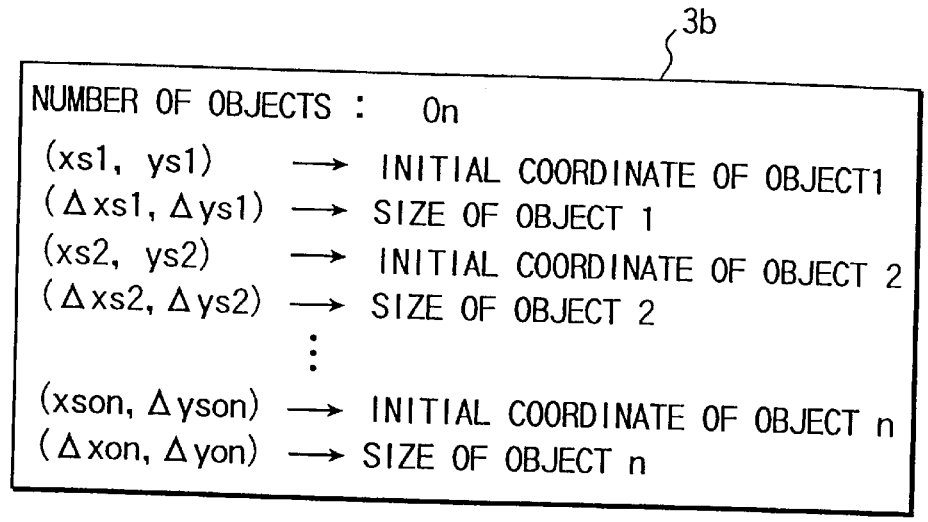
FIG. 9 shows the featuring amount stored in the feature storing section shown in FIG. 4.

In this manner, the coordinates extraction section 43 calculates the featuring amount. The featuring amount is written in the featuring amount storing section 3b on the basis of a write address supplied from the featuring amount access section 32, in response to the instruction of the CPU. FIG. 9 shows one example of the contents of the featuring amount stored in the featuring amount storing section 3b. The featuring amount storing section 3b stores the coordinates of the initial point and the size of every physical block (object) corresponding to one character extracted from the coordinates extraction section 43, as the featuring amount of the physical block.

On the other hand, the featuring amount (the scanning area, the original document area, the number of objects, the initial point, size, and the like) extracted by the entire image projecting section 36 and the partial projection section 37 is stored in the image region discrimination information storing section 3d.

The featuring amount storing section 3b mainly stores the featuring amount of the image region in units of one character. The featuring amount stored in the image region discrimination information storing section 3d is more vague than that stored in the featuring amount storing section 3b.

Figure 10:
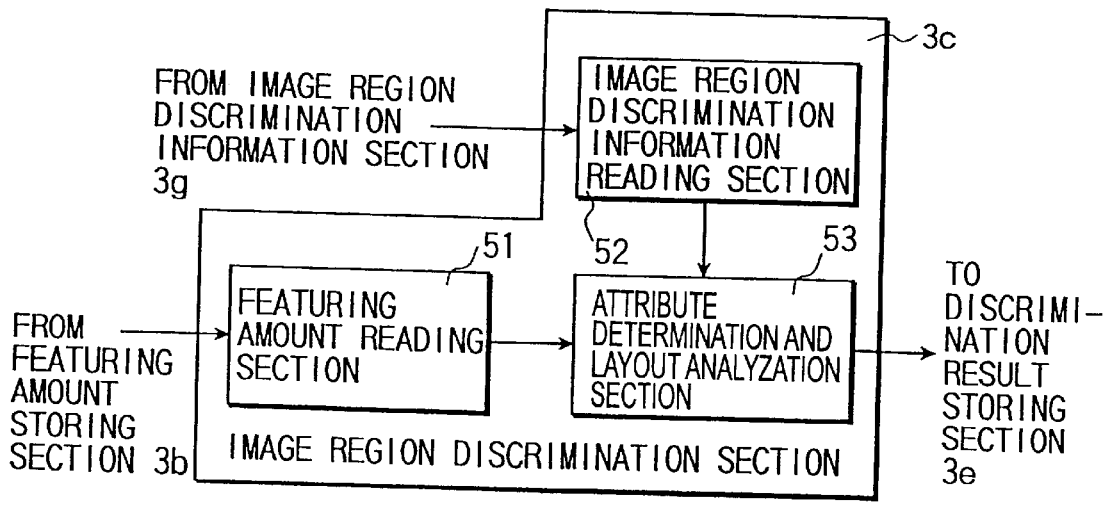
FIG. 10 is a block diagram showing the constitution of an image region discrimination section shown in FIG. 4.

Next, the image region discrimination section 3c shown in FIG. 4 will be described next. FIG. 10 shows the constitution of the image region discrimination section 3c. The featuring amount (initial coordinates, size, and the like) of each image object in the image of the original document is supplied from the featuring amount storing section 3b to a featuring amount reading section 51. An image region discrimination information reading section 52 reads determination information about unnecessary region, scanning area, original document area, or the like from the image region discrimination information storing section 3d. The section 52 reads the initial point, size of each object (character) from the partial projection section 37.

An attribute determination and layout analyzation section 53 determines the attribute (character region, photograph region, or the like) of each of the objects on the basis of the information supplied from the featuring amount reading section 51 and the image region discrimination information reading section 52. Further, the attribute determination and layout analyzation section 53 unites a collection of the objects having the same attribute so as to discriminate one or a plurality of image regions (each consisted of one or a plurality of objects) from the image of the original document.

The collection of the objects can also be united by extending the result of the longitudinal projection and the result of the lateral projection (shown in FIG. 6), for example, for a predetermined distance, in the longitudinal direction and the lateral direction, respectively. The result of the discrimination is stored in the discrimination result storing section 3e, as is shown in FIG. 11.

The word "attribute" means a type of an image region, e.g., a character region or a photograph region. Hereinafter, the region other than image regions given such attributes present in the original document, i.e., the image region containing nothing will be called "blank region." The area of the blank region may be stored as one of the attributes of the image region, in the discrimination result storing section 3e.

FIG. 11 shows an example of the contents of the region discrimination result stored in the discrimination result storing section 3e. The section 3e stores the number of the discriminated image regions, the coordinates of the initial point of each image region, the size of each image region, the attribute given to each image region. Further, the section 3e stores the data showing whether or not the user has specified some points, as will be described later.

Image Region Selecting Section

The image region selecting section 4 provides the discrimination result in the original document image region discriminated by the image discriminating section 3. For example, as shown in FIG. 12, the image region selecting section 4 sends to the user interface section 7 the positions of the four image regions A, B, C and D which are discriminated from the image of the original document.

Figure 12:
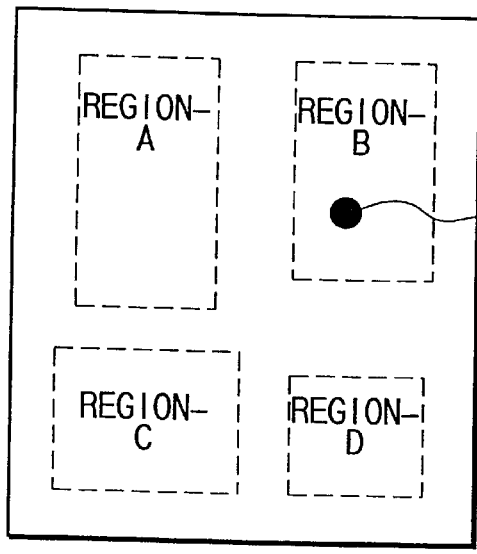
FIG. 12 schematically shows the discrimination result displayed by a user interface section shown in FIG. 1 and the specifying method of the image region.

The discrimination result of the original document image region by the image discriminating section 3 may be displayed in a form of the contour of the image region in the frame of the original document, as shown in FIG. 12, on the basis of the positional information of the image region, which is extracted by the attribute determination and layout analyzation section 53 shown in FIG. 10. Further, attribute information such as character region or photograph region or the like may be simultaneously indicated by the display (in the contour of each image region, for example). Otherwise, the contour indicating the area of the extracted image region may be overlapped on the image of the original document. Further, the attribute, area, or the like of each of the extracted image regions may be indicated by character information, as shown in FIG. 11.

When the user specifies a point P1 in an image region which the user wants to process on the basis of the image region discrimination result of the image of the original document indicated by the user interface section 7, the positional information of the point P1 is input into the system control section 9 via the interface controller 8. The system control section 9 stores the positional information as the specified coordinate value (Xu, Yu) in the system information storing section 10, and also supplies to the image region selecting section 4.

The image region selecting section 4 determines to which image region the specified position belongs, on the basis of the specified coordinate value (Xu, Yu) and the positional information of each image region as the discrimination result by the image discriminating section 3. The image region selecting section 4 sets in the discrimination result storing section 3e of the image discriminating section 3 a flag ("1") of the specified image region, which indicates whether or not the image region is specified by the user, as shown in FIG. 13. FIG. 13 shows the case where the region B is specified.

An example of a method of determining the image region corresponding to the point (Xu, Yu) specified by the user on the basis of the specified point will be described below.

If the following conditions are satisfied, the specified coordinates is located in one of the image regions in the image of the original document (see P1 in FIG. 12),

[(Yis≦Yu) and (Xis≦Xu)] and

[(Yis+ΔYi)≧Yu] and [(Xis+ΔXi)≧Xu]

where the initial point of each image region in the image of the original document is (Xis, Yis ), and the size is (ΔXi, ΔYi).

The image region including the specified coordinates is thus determined as the specified region. The specified region is displayed in brightness different from that of the other regions and is thereby distinguished from the other regions.

When the inner point in one of the image regions in the image of the original document cannot be specified due to the function, size, or the input device of the display of the user interface section 7, the image region nearest to the specified point may be selected instead thereof.

Figure 14:
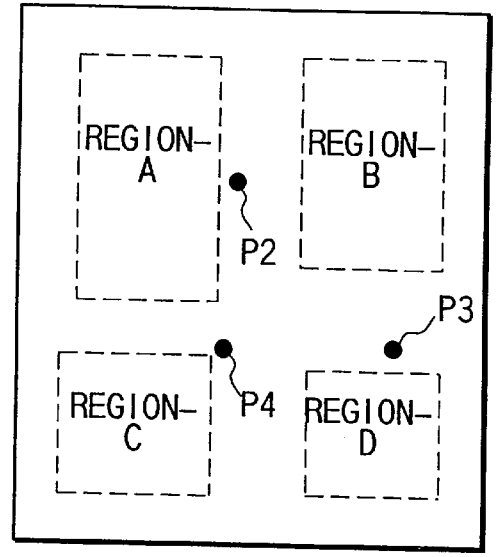
FIG. 14 schematically shows the methods of specifying and selection of the image region.

As shown in FIG. 14, a plurality of image regions A, B, C and D extracted from the image of the original document are indicated by the user interface section 7. When a point P2 positioned between the image regions A and B, is specified by the user, since the image region A is nearer to P2 than the image region B, the image region A is selected.

Where the coordinates of P2 is (Xp2, Yp2), the image region A has the initial point (XaS, YaS) and the size (ΔXa, ΔYa), the image region B has the initial point (XbS, YbS) and the size (ΔXb, ΔYb), the image region C has the initial point (XcS, YcS) and the size (ΔXc, ΔYc), and image region D has the initial point (XdS, YdS) and the size (ΔXd, ΔYd), then the end point of the image region A is represented as (XaS+ΔXa=XaE, Yas+ΔYa=YaE), the end point of the image region B is represented as (XbS+Δxb=XbE, YbS+ΔYb=YbE), the end point of the image region C is represented as (XcS+ΔXc=XcE, YcS+ΔYc=YcE), and the end point of the image region D is represented as (XdS+ΔXd=XdE, YdS+ΔYd=YdE). The relationship between the points are represented as follows:

(YaS, YbS)<Yp2

(YaE, YbE)>Yp2

(YcS, YdS)<Yp2

On the basis of the above, the point P2 can be determined to be located between the image regions A and B.

Further, |(XaE−Xp2)| is the minimum value among the absolute values |(XaS−Xp2)|, |(XaE−Xp2)|, |(XbS−Xp2)|, |(XbE−Xp2)| where |X| represents the absolute value of X. The image region A is thus determined to be the nearest to P2, and then the image region A is selected.

When the user specifies a point P3 positioned between the image regions B and D, the image region D nearer to P3 than the image region B is selected.

The coordinates (Xp3, Yp3) of P3 can be represented as follows:

(XbS, XdS)<Xp3

(XbE, XdE)>Xp3

(XaE, XcE)<Xp3

On the basis of the above-presented relationship, P3 can be determined to be positioned between the image regions B and D.

The absolute value |(YdS−Yp3)| is the minimum one among the absolute values |(YbS−Yp3)|, |(YbE−Yp3)|, |(YdS−Yp3)|, |(YdE−Yp3)|, and the image region D is determined to be nearest to P3 and then selected.

Similarly, when a point P4 is specified, the image region C is selected since the image region C is the nearest to P4 among the image regions A, B, C and D.

The process of selecting an image region containing, as an attribute, characters or photographs, by specifying one point on the image of the original document has been described. The present invention is not limited to this process. A non-image region, or a blank region, may be selected from the images of the original document on the basis of the specified coordinates values, when the specified coordinates are not present in the extracted image region.

One example of the methods of selecting an image region in the latter case will be described below.

This method of selecting a blank region helps to insert, in the original document, a desired image into a blank region which contains nothing.

Figure 15:
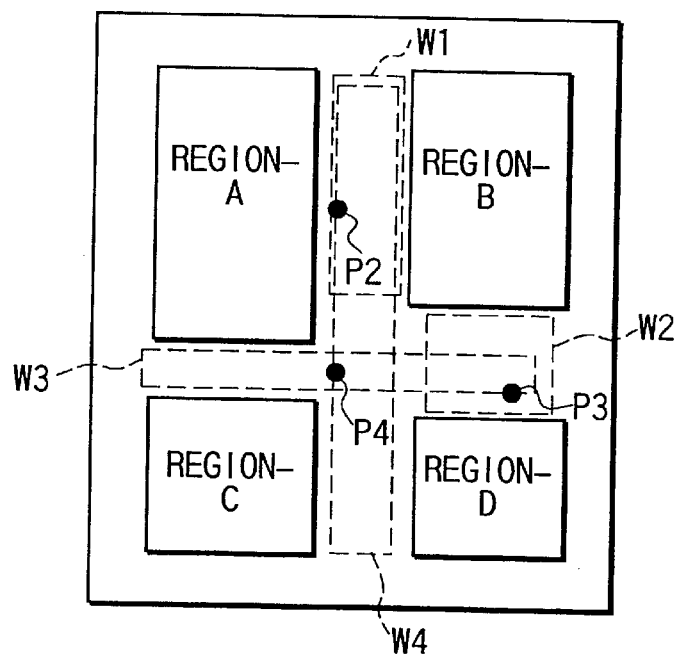
FIG. 15 schematically shows the selecting operation of selecting the image region and a blank region.

Assume that a plurality of image regions A, B, C, and D extracted from the image of the original document is displayed in the user interface section 7, as is illustrated in FIG. 15. When a point P2 is specified by the user, the blank region w1 existing between the image regions A and B is selected, because the point P2 exists in the blank region w1. The initial point (Xp2S, Yp2S) and the end point (Xp2E, Yp2E) of the rectangular blank region w1 are calculated as shown below:

Xp2S=XaE+ΔMx

Xp2E=XbS−ΔMx

Yp2S=max (YaS, YbS)+ΔMy

Yp2S=min (YaE, YbE)−ΔMy where max (i, j) is a function for selecting the maximum one of the values i and j, and min (i, j) is a function for selecting the minimum one of the values i and j. ΔMx and ΔMy are respectively offset values in X and Y directions, and default values may be set by the system, or set by the user.

Similarly, when P3 is specified, the blank region w2 is selected, because P3 is located in a blank region w2 present between the image regions B and D. For example, the initial point (Xp3S, Yp3S) and the end point (Xp3E, Yp3E) of the rectangular blank region w2 are calculated by the process as shown below.

Xp3S=max (XaS, XdS)+ΔMx

Xp3E=min (XbE, XdE)−ΔMX

Yp3S=YbE+ΔMy

Yp3S=YdS−ΔMy

P4 is not located in the region held by any two of the image regions A, B, C and D, unlike the cases of P2 and P3. According to the above-mentioned method, when P4 is specified, two blank regions w3 and w4 are extracted.

The Blank region w3 has the coordinates as shown below:

Xp4S=min (XaS, XcS)+ΔMx

Xp4E=max (XbE, XdE)−ΔMx

Yp4S=max (YaE, XbE)+ΔMy

Yp4E=min (YcS, YdS)−ΔMy

The Blank region w4 has the coordinates as shown below:

Xp4S=max (XaE, XcE)+ΔMx

Xp4E=min (XbS, XdS)−ΔMx

Yp4S=max (YaS, XbS)+ΔMy

Yp4E=min (YcE, YdE)−ΔMy

As described above, more than one region may be selected depending on the position of the specified point. One of these image regions thus specified and selected by the user may be automatically selected as a region in which another image will be inserted, if this image region has desired features, such as a desired size. Alternatively, the image regions thus selected may be displayed to the user through the user interface section 7, so that the user may select one of them which is desirable to him or her.

User Interface Section

The user interface section 7 can be constituted of various I/O devices such as an LCD indicator (control panel) comprising a key board, a CRT, a touch panel, and the like. A user interface constituted of a control panel will be described below. The user interface according to the present invention is not limited to that comprising a control panel, but the other I/O devices may be used without departing from the spirit and scope of the invention.

Figure 16:
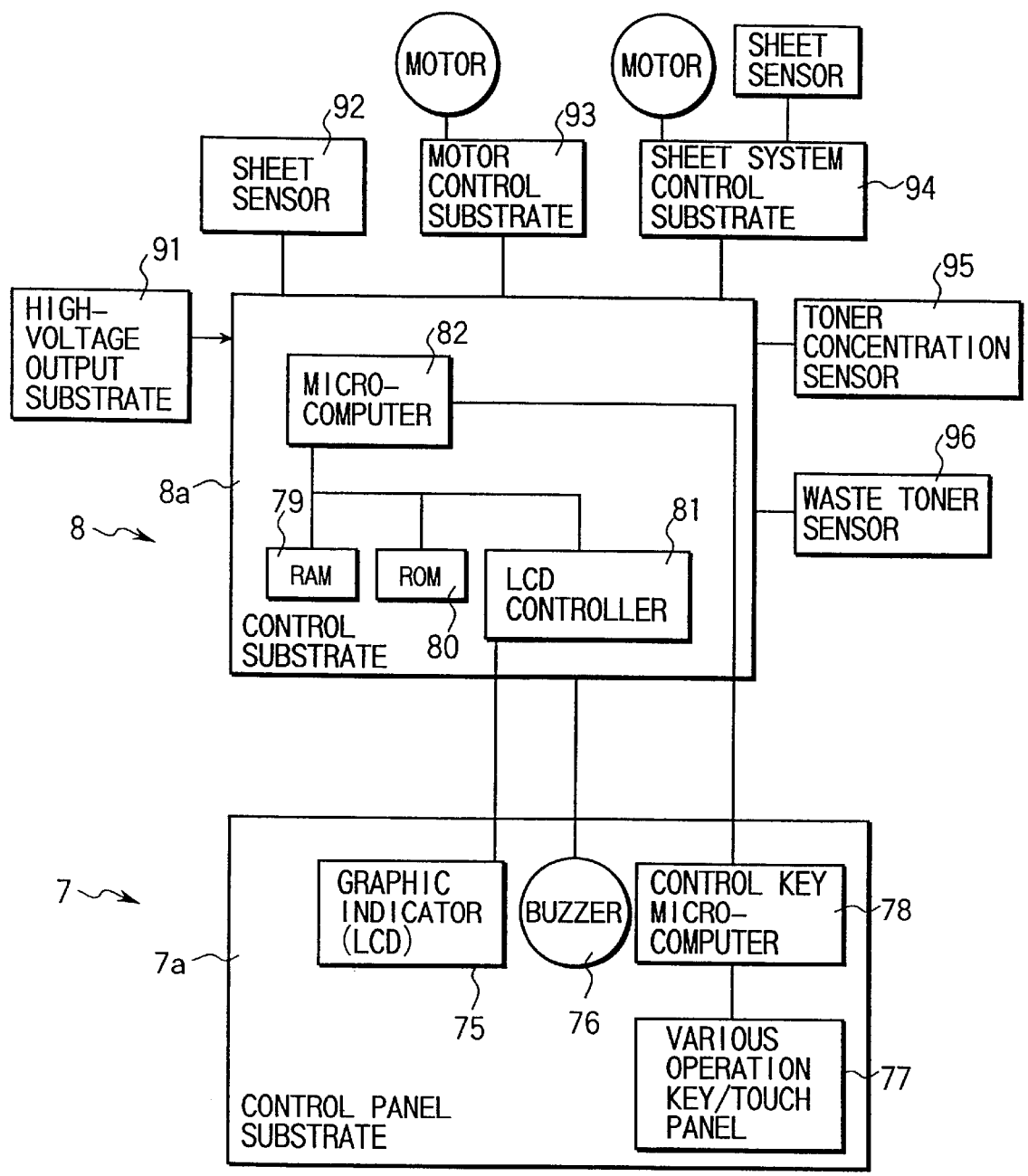
FIG. 16 shows the constitution of a control panel and an interface controller.

FIG. 16 shows the constitutions of the user interface section 7 and the interface controller 8. The user interface section 7 is mainly constituted of a control panel substrate 7a, and the interface controller 8 is mainly constituted of a control substrate 8a.

The control panel substrate 7a is provided with an LCD indicator (LCD) 75, a touch panel, and various operation keys 77, and a control key microcomputer 78 for checking the depression state of the I/O devices. The control key microcomputer 78 sends the depression state of the I/O devices to a microcomputer 82 of the control substrate 8a. The microcomputer 82 processes information sent from the control key microcomputer 78, information from various sensors such as a sheet sensor 92 connected to the control substrate 8a and a toner concentration sensor 95, in accordance with various control programs stored in a ROM 80 and a RAM 79, and the process result is displayed in the LCD 75 by the LCD controller 81.

The ROM 80 stores data to be indicated in the display, the program data, or the like, and the RAM 79 stores a period of time required for the switching the display. The RAM 79 further store information necessary for indicating the image regions sent from the image region selecting section 4, or the other parameters, for example. The image region information is then sent to the system information storing section 10 through the system control section 9 of FIG. 1.

The information necessary for displaying the image regions extracted from the image of the original document is controlled by the microcomputer 82 to be read from the RAM 79. On the basis of the read information, the display data is prepared. The display data is sent to the LCD 75 through the LCD controller 81, and displayed as shown in FIG. 12.

The control substrate 8a mainly controls the LCD 75, the touch panel 77, and the like, and controls the motors to drive, in necessity. In addition to the above-mentioned functions, the control substrate 8a detects sheet jam, empty toner cartridge, and the like, in receiving a signal generated by the sheet sensor, a waste toner sensor, a toner concentration sensor, or the like, and buzzes a buzzer 76 presented on the control panel, if necessary.

The LCD controller 81 sends a display control signal to the LCD 75 on the basis of the signal sent from the microcomputer 82, the graphic display is thereby attained thereby.

Image Processing Section

The image processing section 5 performs the process specified by the user for the image region selected by the image region selecting section 4. The following is one example of the image processing:

1. Image Editor:

There may be various methods of editing images. In one of these methods, a selected image region can be clipped to be magnified. The magnification may be performed, for example, by means of linear interpolation which is generally used.

The image processing section may have editing functions (digital image processing) generally provided in the conventional word processors or the like. The editing functions are changing the color (e.g., black to red) of the selected region, and changing the characters in the region to outline or slanted ones.

2. Image Replacement:

The image replacement is a process of replacing a selected region with the other image data input lately. For example, it is determined whether the data to be inserted should be magnified or reduced, on the basis of the initial and end coordinates of the image region and the data to be inserted. If the data should be magnified, it is magnified and inserted into the region, instead of the image present in the region. If the data should be reduced, it is reduced and inserted, instead of the image present in the region. If the data need not be magnified or reduced, it is inserted, without being changed in size.

3. Image Insertion:

According to the apparatus of step 1, secret or key information can be inserted in an invisible state into the selected image region. The information insertion process is not performed on the entire original document, but in a limited region specified by the user. The information insertion process is, however not the main feature of the present invention, and thus the detailed description thereof will be omitted.

When the specified region is a blank region, not only the invisible information but also a visible image can be inserted. When a visible image is inserted into the blank region, the image is magnified/reduced on the basis of the area of the blank region and the size of the information to be inserted, and then inserted therein.

The user may select desired one of the above-mentioned processes with use of the user interface section 7. The entire image of the original document which includes the image in the image region processed by the image processing section 5 is temporarily stored in the output image data storing section 6.

Output Image Data Storing Section

The output image data storing section 6 is intended to temporarily store the image output through the image output section 11. When a plurality of images is united into one piece of image information, the output image data storing section 6 needs to function as a page memory. When some information needs to be deleted from one image of the original document, the output image data storing section 6 needs to function as a line buffer of only few lines.

Image Output Section

The image output section 11 outputs the image stored in the output image data storing section 6. The image output section 11 is constituted of, for example a printer which outputs the data printed on a sheet.

System Control Section

The system control section 9 controls all the operations related to the present invention by the system. The system control section 9 is constituted of a CPU and the other peripheral devices. The system control section 9 supplies a timing signal, a clock signal, a control signal, and parameters used for various processes to the above-mentioned section.

System Information Storing Section

The system information storing section 10 stores data or program necessary for the entire system.

External Interface Section

The external interface section 12 is provided to send to the external apparatus through an arbitrary communication network the image region processed by the image processing section 5 or the entire image of the original document which includes the specified image region. The external interface section 12 is, for example a FAX MODEM using a telephone network, an interface for connecting the apparatus to specified network.

When the system comprises the image forming apparatus according to the present embodiment is connected to a plurality of image forming apparatuses through the external interface section 12 and a network, the system becomes sufficiently effective if at least one of the image forming apparatuses comprises an image output section 11. More specifically, the image of the selected region can be processed, transmitted through the external interface section 12 and printed, even if the region has been selected by an image forming apparatus (or image processing apparatus) that does not have the image output section 11.

Process Operation

Figure 17:
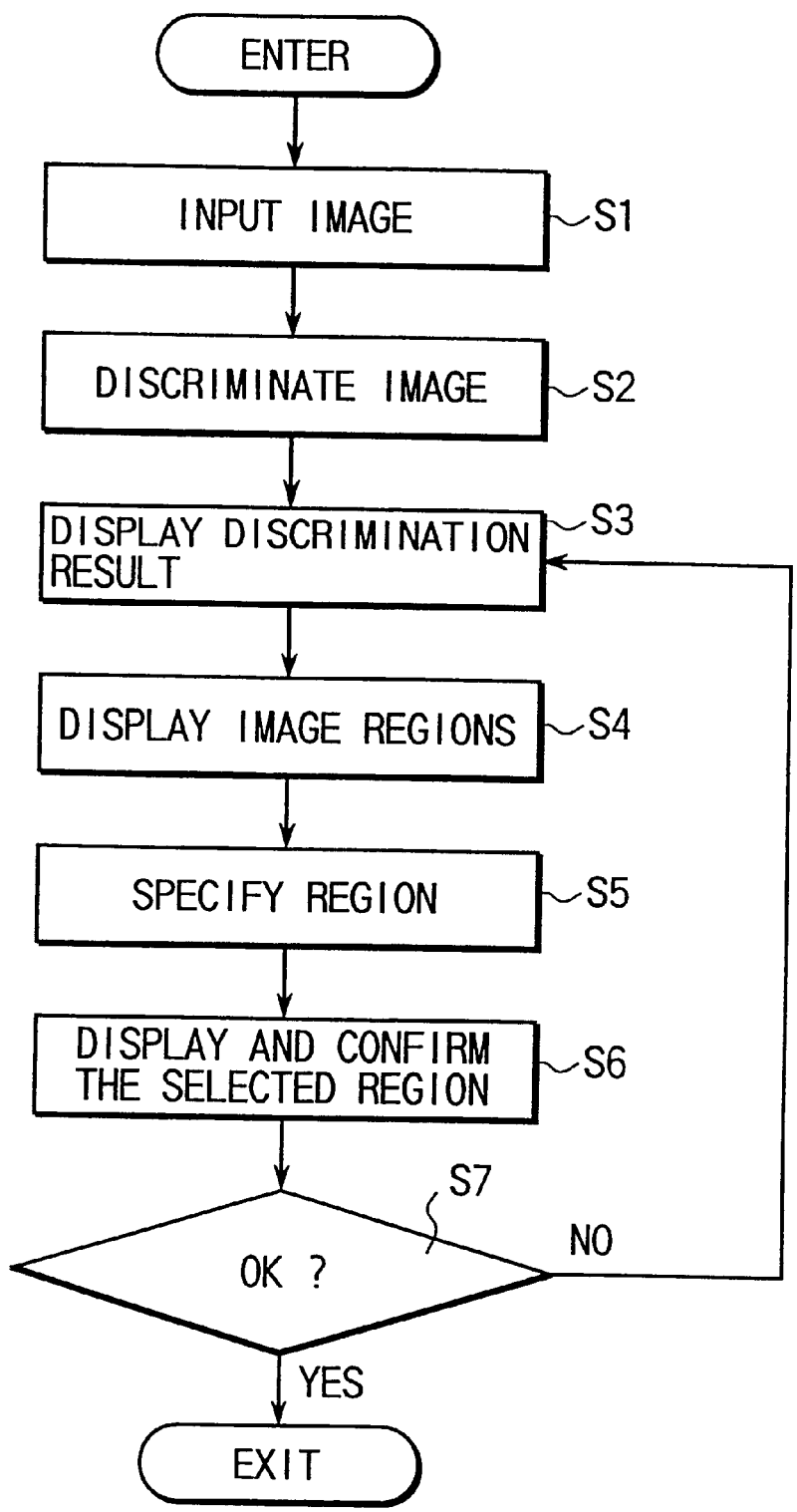
FIG. 17 is a flow chart schematically representing the processing operation of the image forming apparatus shown in FIG. 1.

The following is the description of the process operation by the image forming apparatus having the above-mentioned constitution, with reference to the flow chart shown in FIG. 17.

At first, the image of the original document which is to be processed is input into the image input section, and temporarily stored in the input image storing section 2 (STEP S1). The image of the original document stored in the image storing section 2 is discriminated by the image discriminating section 3 (STEP S2), and the discrimination result is displayed by the user interface section 7. In this time, image regions discriminated from the image of the original document are also displayed (STEPS S3 and S4). While watching the display, the user specifies at least one point (STEP S5). The image region selecting section 4 selects the image region corresponding to the coordinates of the specified point. The selected image region is displayed to the user by the user interface section 7 (STEP S6). If the user interface section 7 has some keys to input such instructions such as "confirm" or "cancel" the selected image region, the following process is performed in accordance with the instruction input by operating the keys (STEP S7). More specifically, when the key of "confirm" is depressed ("YES"), a desired process is selected to be performed for the selected image region ("EXIT"). On the other hand, when the key of "cancel" is depressed ("NO"), the process backs to STEP S3 to repeat the above-mentioned steps.

As described above, according to the above-mentioned embodiment, a desired image region in the image of the original document can be easily (just by user's one action) specified with use of image discrimination technique, and the specified image region can be displayed. When the specified image region needs to be corrected, the specified image region can be corrected after specifying the portion to be corrected is specified and displaying the image constitution after the correction.

What is claimed is:

1. An image processing apparatus comprising:

image region determination means for determining a plurality of image regions in the original document on the basis of input image data of the original document;

display means for displaying positions of the image regions determined by the image region determination means in the image of the original document;

specifying means for specifying at least one position of a point on the basis of contents displayed by display means;

determination means for determining an image region corresponding to the specified position as a specified region on the basis of coordinates of the position specified by the specifying means and relative positions of the image regions, and for determining a non-image region as a specified region when the specified position is located in the non-image region which lies between at least two regions that are determined by the image region determination means, wherein said display means displays the non-image region by discriminating the non-image region from the other image regions; and image processing means for processing an image in the specified region determined by the determination means.

2. The apparatus according to claim 1, wherein the display means has means for displaying a contour of each of the image regions determined by the image region determination means at a corresponding position in a frame of the image of the original document.

3. The apparatus according to claim 1, wherein the image region determination means comprises;

featuring amount calculating means for calculating a position and a size of each of objects constituting the image of the original document in order to supply them as a featuring amount; and means for determining a plurality of image regions by unifying each of collections of the objects having the same attribute on the basis of the featuring amount.

4. The apparatus according to claim 1, wherein the image processing means has image insertion means for inserting another image into the image of the specified region.

5. An image forming apparatus comprising:

scanning means for optically scanning an image of an original document to supply image data of the original document;

image region determination means for determining a plurality of image regions in the image of the original document on the basis of the image data of the original document supplied from the scanning means;

display means for displaying positions of the image regions determined by the image region determination means in the image of the original document;

specifying means for specifying at least one position of a point on the basis of the positions displayed by the display means;

determination means for determining as a specified region an image region corresponding to the specified position on the basis of coordinates of the position specified by the specifying means and relative positions of the image regions, and for determining a non-image region as a specified region when the specified position is located in the non-image region which lies between at least two regions that are determined by the image region determination means, wherein said display means displays the non-image region by discriminating the non-image region from the other image regions;

image processing means for processing the image of the specified region determined by the determination means; and image forming means for forming an image on the basis of the image data of the original document which is supplied from the scanning means and the image data processed by the image processing means.

6. The apparatus according to claim 5, wherein the display means has means for displaying a contour of each of the image regions determined by the image region determination means at a corresponding position in a frame of the image of the original document.

7. The apparatus according to claim 5, wherein the image region determination means has a featuring amount calculating means for calculating position and size of each object constituting the image of the original document so as to provide the position and the size as a featuring amount, and means for determining a plurality of image region by unifying each of collections of objects having the same attribute respectively on the basis of the featuring amount.

8. A method of specifying image regions, comprising:

image region discrimination step of discriminating a plurality of image regions in an image of the original document on the basis of input image data of the original document, display step of displaying a position of the image regions discriminated in the image region discrimination step in the image of the original document, specifying step of specifying at least one position of a point on the basis of the position displayed by the display step, and determining step of determining an image region corresponding to the specified position as a specified region on the basis of coordinates of the position specified in the specifying step and relative positions of the image regions, and of determining a non-image region as a specified region when the specified position is located in the non-image region which lies between at least two regions that are discriminated by the image region discrimination step and displaying the non-image region by discriminating the non-image region from the other image regions.

9. The method according to claim 8, wherein the display step has a step of displaying a contour of each of the image regions discriminated in the image region discrimination step at a corresponding position in a frame of the image of the original document.

10. The method according to claim 8, wherein the image region discrimination step has a featuring amount calculation step of calculating a position and a size of each of objects constituting the image of the original document so as to supply the position and the size as a featuring amount, and a step of discriminating a plurality of image region by unifying collections of the objects having the same attribute respectively on the basis of the featuring amount.

* * * * *